United States Patent [19]

Eckert, Jr. et al.

[11] 4,442,501

[45] Apr. 10, 1984

[54] ELECTRONIC POSTAGE METER WITH WEAK MEMORY INDICATION

[75] Inventors: Alton B. Eckert, Jr., Norwalk; Edward C. Duwel, Trumbull, both of Conn.

[73] Assignee: Pitney Bowes Inc., Stamford, Conn.

[21] Appl. No.: 238,330

[22] Filed: Feb. 26, 1981

[51] Int. Cl.[3] .................................................. G06F 1/00

[52] U.S. Cl. ...................................................... 364/900

[58] Field of Search ... 364/200 MS File, 900 MS File, 364/466 HS, 466

[56] References Cited

U.S. PATENT DOCUMENTS

| | | | |
|---|---|---|---|
| 3,978,457 | 8/1976 | Check, Jr. et al. | 364/200 |
| 4,097,923 | 6/1978 | Eckert | 364/900 |
| 4,122,532 | 10/1978 | Dlugos et al. | 364/900 |
| 4,180,856 | 12/1979 | Check, Jr. et al. | 364/466 |
| 4,251,874 | 2/1981 | Check | 364/900 |
| 4,266,222 | 5/1981 | Eckert et al. | 364/900 |
| 4,306,299 | 12/1981 | Check, Jr. et al. | 364/900 |
| 4,347,506 | 8/1982 | Duwel et al. | 364/900 |

FOREIGN PATENT DOCUMENTS 19515 5/1980 United Kingdom .

*Primary Examiner*—Gareth D. Shaw
*Assistant Examiner*—Daniel K. Dorsey
*Attorney, Agent, or Firm*—Peter Vrahotes; William D. Soltow, Jr.; Albert W. Scribner

[57] ABSTRACT

An electronic postage meter having an accounting section including a nonvolatile memory (NVM), computer means for reading the condition of the nonvolatile memory during a power-up cycle of the meter, and means in the meter for storing any signal which results from the reading of the nonvolatile memory by the computer means. In accordance with further aspects of the present invention, a method is provided for determining that an electronic postage meter has a weak nonvolatile memory, a data center and service department are adapted to receive signals from the meter indicating a weak nonvolatile memory, and an intercommunication system is established between the data center to receive signals from the meter indicating a weak nonvolatile memory.

14 Claims, 7 Drawing Figures

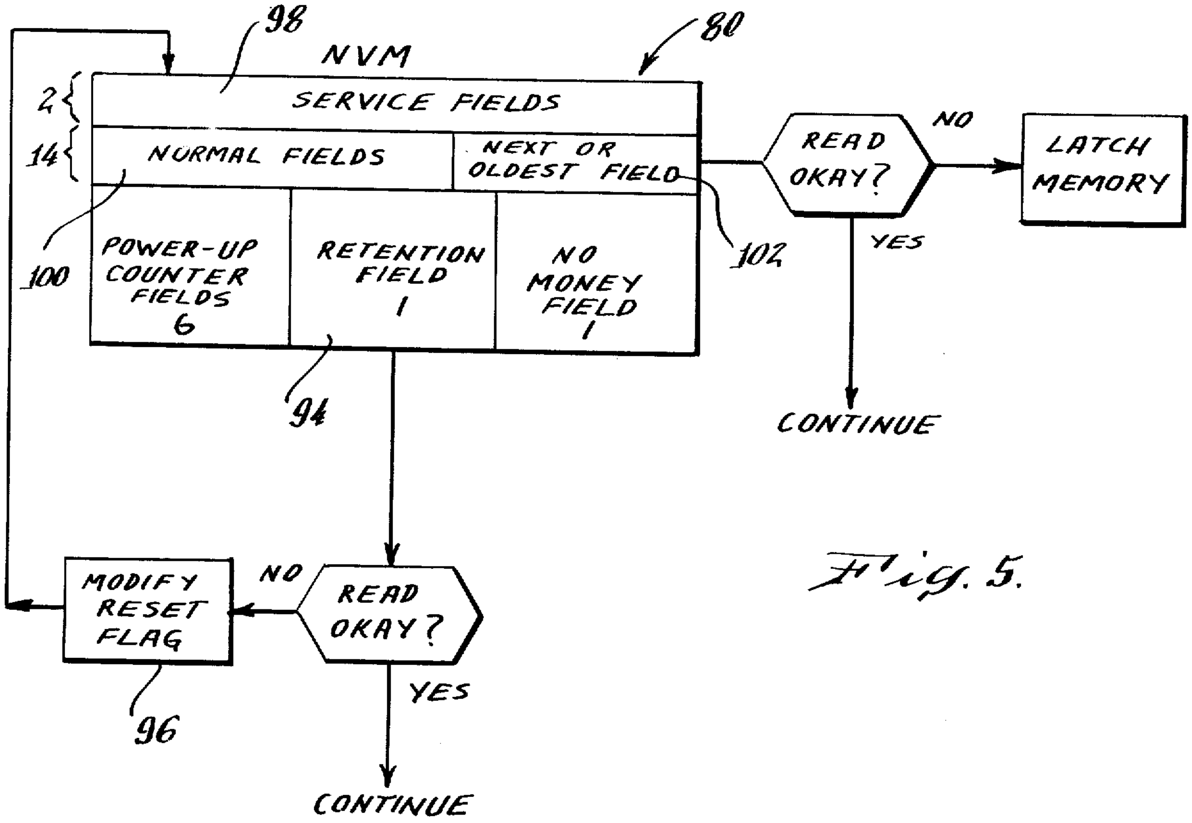
Fig. 5.
Fig. 6.
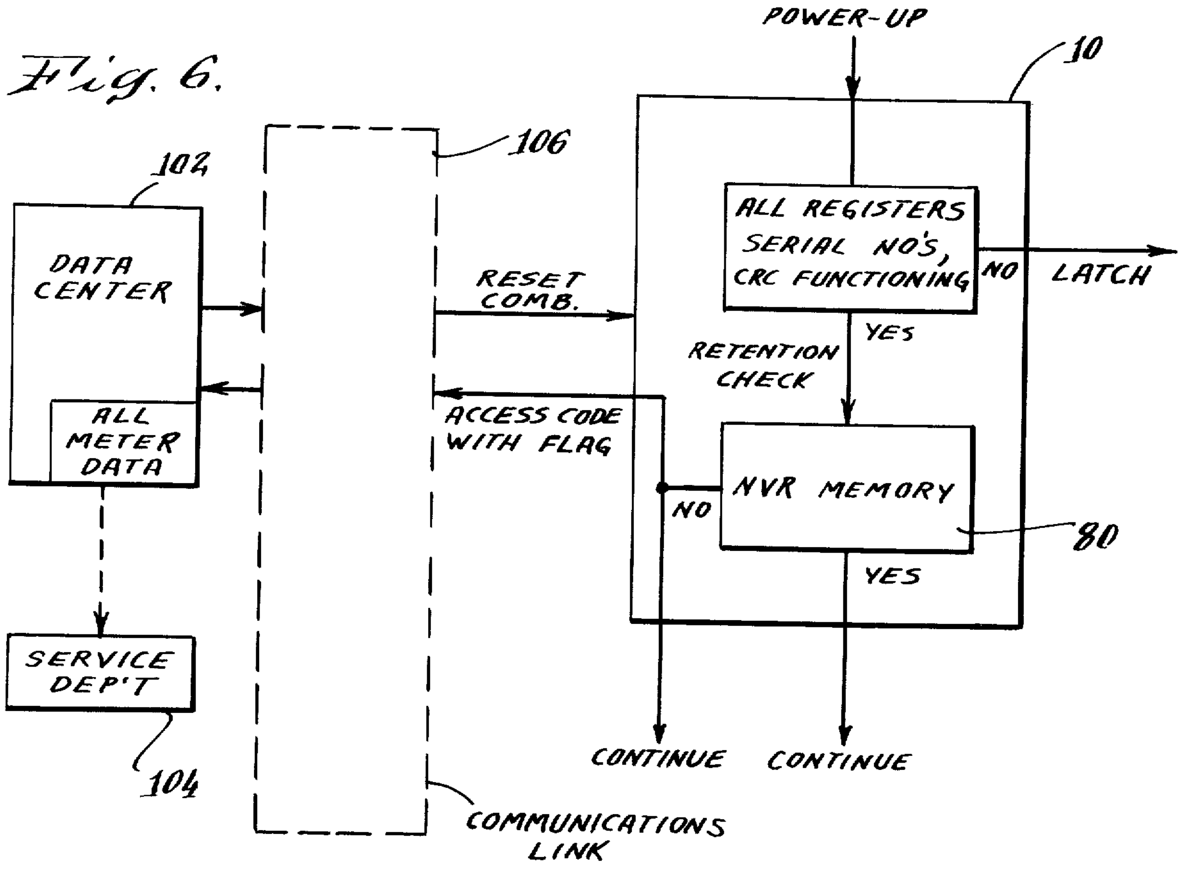

ELECTRONIC POSTAGE METER WITH WEAK MEMORY INDICATION

FIELD OF THE INVENTION

This invention relates to electronic postage meters, and more specifically to an electronic postage meter having a nonvolatile memory (NVM).

BACKGROUND OF THE INVENTION

Postage meters are devices for dispensing value in the form of postage printed on a mail piece such as an envelope. The term postage meter also includes other similar meters such as parcel post meters. Meters of this type print and account for postage stored within the meter. Since representations of postage available for printing are stored in the meter, the postage meter must be provided with safeguards against tampering.

Within the above requirement, systems have been developed to enable postage meters to be recharged or reset with additional postage for printing by the meter without the need to physically carry the postage meter back to the postal authorities for resetting. This avoids the inconvenience to the users of the postage metered mailing system by avoiding the necessity to bring the meters to the postal service for resetting or recharging. The remote recharging systems have met the requirement of security for the postage meters and have been developed for both fixed increment resetting for mechanical meters and variable increment resetting for electronic meters.

In the mechanical resetting meters, the system is equipped with a combination lock whose combination changes in a predetermined random sequence (often referred to as pseudo-random sequence) each time it is actuated. The combination lock operates on the resetting mechanism of the postage meter such that, when unlocked, the mechanism may be manipulated to recharge the meter with a postage increment. As the meter is recharged, the combination lock automatically locks itself to prevent subsequent recharging of the meter unless and until the correct new and different combination is entered. Combination locks of this type, suitable for use in postage meters are disclosed in U.S. Pat. Nos. 3,034,329 entitled Combination Lock Device and 3,664,231 entitled Locking Device.

The remote meter resetting system may also be incorporated in electronic postage meters such as described in U.S. Pat. No. 4,097,923 for REMOTE POSTAGE CHARGING SYSTEM USING AN ADVANCED MICROCOMPUTERIZED POSTAGE METER. This resetting system involves a data center which may be equipped with a voice answer back unit. The data center processes telephone calls from the postage meter users, requiring the transmission by the user of information unique to the particular meter being reset. The information is used to verify the authenticity of the call and to update the record of the user stored at the data center.

The postage meter user informs the data center of the postage which is desired to be funded into the meter. The postage amount requested for resetting may be varied according to the requirement of the user. The computer at the data center formulates a combination based on the identifying information and the amount of postage requested for resetting. This combination is then transmitted back to the user. The user enters both the amount and the combination into the postage meter.

The postage meter contains circuitry for comparing the entered combination with an internally generated combination based upon the amount of postage requested for resetting and the identifying information. If the entered combination matches the internally generated combination, the funding registers of the meter are increased by the new postage amount.

A system disclosed in copending U.S. patent application Ser. No. 024,813, about to issue as U.S. Pat. No. 4,253,158, filed Mar. 28, 1979, for Robert B. McFiggans, entitled, SYSTEM FOR SECURING POSTAGE PRINTING TRANSACTIONS employs encryptors at both a printing station and an accounting station interconnected through an insecure communications link. Each time the meter is tripped, a number generator at the printing station is activated to generate a number signal which is encrypted to provide an unpredictable result. The number signal is also transmitted to the accounting station. At the accounting station, the postage to be printed is accounted for and the number signal is encrypted to provide a reply signal. The reply signal is transmitted to the printing station where a comparator compares it with the encryption results generated at the printing station. An equality of the encryption result and the reply signal indicates that the postage to be printed has been accounted for and the printer is activated.

Although the above systems operate quite satisfactorily for their intended purpose, it has been a constant desire to enhance the security of the postage meter remote recharging systems and to provide improved performance. This is particularly so with variable increment resetting which requires a more secure and more complex environment than fixed increment systems. The reasons for this are that the amounts which may be involved in a reset can be substantially larger than with fixed systems where the amount is established in advance.

Systems for enhancing the security of a remotely resettable postage meter are described in U.S. patent application Ser. No. 168,932, filed July 14, 1980, in the names of Edward C. Duwel and Howell A. Jones, Jr., entitled, IMPROVED POSTAGE METER RECHARGING SYSTEM, and U.S. patent application Ser. No. 168,931, filed July 14, 1980, for Ronald L. Rivest, entitled, DATA CENTER FOR REMOTE POSTAGE METER RECHARGING SYSTEM HAVING PHYSICALLY SECURE ENCRYPTING APPARATUS AND EMPLOYING ENCRYPTED SEED NUMBER SIGNALS, both assigned to the assignee of the present application. The disclosures of these patent applications are hereby incorporated by reference. In this connection, various security measures have been implemented at the data center to protect the information stored in the data center's records. To this end, physical security has been provided to limit the number of people who may enter the data center and to limit the access to the particular information within the data center. These systems provide a high level of security. It is desired, however, to further increase the level of security at the postage meter recharging system data centers.

In prior devices of the general category including electronic postage meters, it has been found desirable to employ one or more microprocessors to control various meter functions and operations. For security reasons, all data relating to the accounting operation is maintained separately from other data. Therefore it is possible to improve security while employing concepts of distributed processing by the use of multiple processors. In addition, the use of electronics in postage meters allows greater sophistication in automatic recharging of the accounting registers without the need for operating personnel as disclosed in the aforementioned patent applications. Further, improved methods of detecting tampering and performing self-diagnostic error checking can be provided.

An improved electronic postage meter employed multiple microprocessors is disclosed in U.S. patent application Ser. No. 89,413, filed Oct. 29, 1979, in the names of John H. Soderberg, Alton B. Eckert, Jr., and Robert B. McFiggins, entitled ELECTRONIC POSTAGE METER HAVING PLURAL COMPUTING SYSTEMS the disclosure of which is hereby incorporated by reference. In the aforementioned patent application, advantageously the postage meter is provided with accounting, printing and keyboard units, which although mechanically connected together, are each provided with a CPU and a crystal controlled clock, with a nonvolatile memory (NVM) in the accounting unit for data storage during power off. The frequencies of the clocks of the different units need not be identical, and communication between the units is by way of serial messages that are asynchronously transmitted and received.

During operation of the aforementioned electronic postage meter it is important in minimizing malfunction of the meter and possible inconvenience to the customer to detect when the memory retention capability of the NVM has weakened substantially, thereby increasing the likelihood of failure in the near term. One method of accomplishing this is disclosed in German Patent Application 29 16 840, filed Apr. 26, 1979, in which a register is incremented after each power supply recuperation until a predetermined value is reached at which time a service signal is displayed by the meter and a printing prohibition is triggered. Such a system is of necessity pre-programmed for a predetermined number of power supply recuperations and lacks flexibility in that it does not take into account differences in the life cycles of NVM's of different meters.

SUMMARY OF THE INVENTION

It is an object of the present invention to provide an electronic postage meter with a weak memory indication.

It is a further object of the present invention to provide an electronic postage meter having a self-diagnostic memory retention check.

It is a further object of the present invention to provide a method for determining that an electronic postage meter has a weak memory.

It is a further object of the present invention to provide a method for read-verifying the oldest (next) normal field of data in the memory.

It is a further object of the present invention to provide a data center adapted to receive signals from the meter indicating a weak memory.

It is a still further object of the present invention to provide an intercommunication system between the electronic postage meter and the data center to receive signals from the meter indicating a weak memory.

Briefly, in accordance with the present invention, an electronic postage meter is provided having an accounting section including a nonvolatile memory (NVM), computer means for reading the condition of the nonvolatile memory during a power-up cycle of the meter, and means in the meter for storing any signal which results from the reading of the nonvolatile memory by the computer means. In accordance with further aspects of the present invention, a method is provided for determining that an electronic postage meter has a weak nonvolatile memory, a data center and service department are adapted to receive signals from the meter indicating a weak nonvolatile memory, and an intercommunication system is established between the electronic postage meter and the data center to receive signals from the meter indicating a weak nonvolatile memory.

Other objects, aspects and advantages of the present invention will be apparent from the detailed description considered in conjunction with the preferred embodiment of the invention illustrated in the drawings, as follows:

BRIEF DESCRIPTION OF THE DRAWINGS

FIG. 5 is an enlarged view of the nonvolatile memory showing schematically the groups of locations constituting fields of data stored in the nonvolatile memory with certain decisional steps indicated;

FIG. 6 is a block diagram showing intercommunication between the postage meter and data center when the postage meter has been determined to have a weak memory.

DETAILED DESCRIPTION

Figure 1:
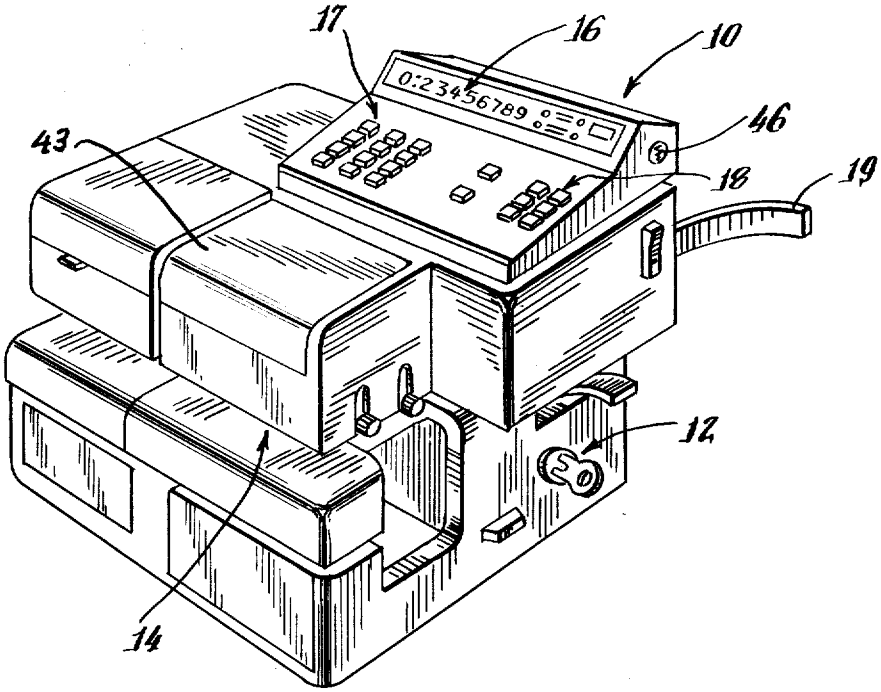
FIG. 1 is a simplified perspective view of a postage meter in accordance with the present invention.

Referring to FIG. 1, therein is illustrated a postage meter 10 in accordance with the present invention removably affixed to a base 12. A slot 14 is provided between the postage meter 10 and the base 12 at the forward edge thereof, for receiving envelopes or the like and the printing of postage thereon. The postage meter 10 is provided with an electronic display panel 16, a keyboard 17 and a control panel 18. The apparatus is energized by way of a supply cable 19.

The postage meter 10 may be of the type that is removable from the base 12, and the base 12 may be of the type disclosed, for example, in the U.S. Pat. No. 2,934,009, Bach et al., incorporating a mechanical drive for operation of the printing mechanism (not shown) in the meter 10. The separability of the meter 10 and base 12 renders the meter 10 compatible with conventional drive units, simplifies servicing of the device and, if necessary, simplifies transport of the meter 10 to the post office for clearing funds and for recharging if remote recharging or resetting capabilities are not employed.

Figure 2:
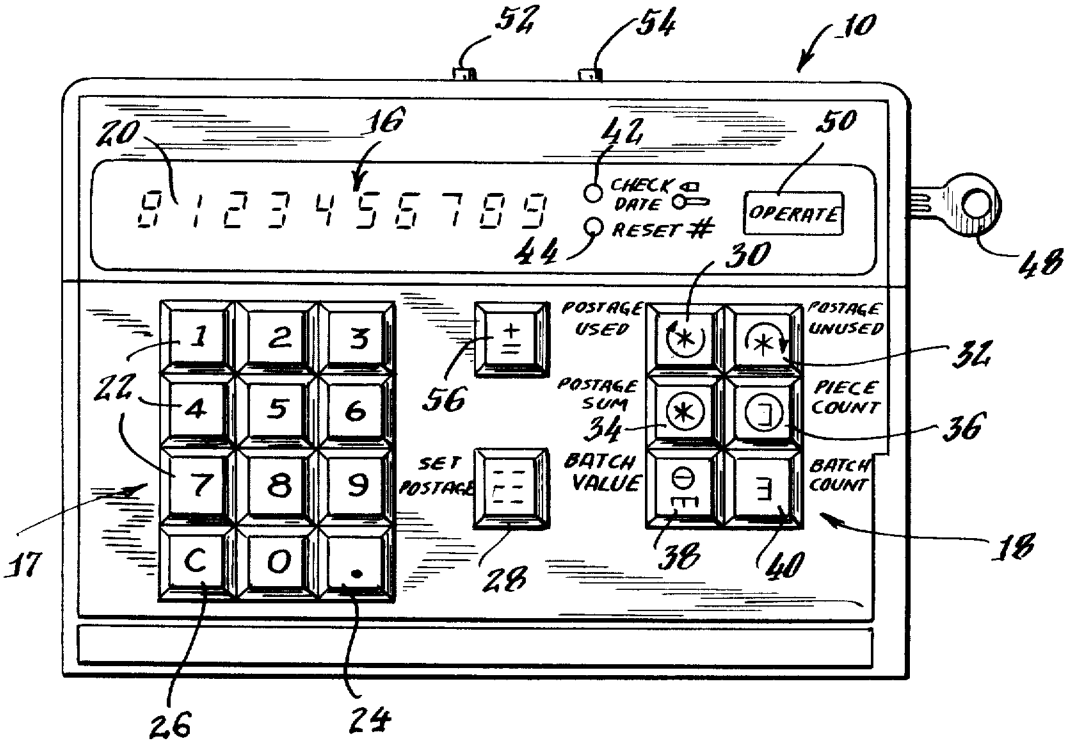
FIG. 2 is an enlarged view of the operating panel of the postage meter of FIG. 1.

One arrangement of the panel 16 for the postage meter 10 is illustrated in FIG. 2, in which the meter has a numeric display 20, for example, a conventional multiplexed seven segment LED or LCD display. In addition, the keyboard 17 is provided with numeric setting keys 22 and a decimal key 24 operative therewith for setting the meter 10 to print a desired amount of postage, the amount normally being displayed on the display 20. A clear key 26 may be provided to clear the display amount in the event, e.g., of an errroneous entry. When the displayed amount has been set to the desired value, depression of a set postage key 28 effects setting of the print wheels (not shown) for setting the postage.

The control panel 18 may be provided with a series of keys enabling the selective display of other values on the display 20. For example, depression of a key 30 may enable the display of the contents of an ascending register in the meter 10, i.e., the postage used by the meter, and depression of a key 32 may enable display of the contents of a descending register in the meter 10, i.e., the postage for which the meter is still changed. Further, keys 34, 36, 38 and 40 may enable display in a conventional manner of other specific specialized values as control or postage sum, piece count, batch value, and batch count, respectively. The batch value and batch count registers (not shown) can be cleared by simultaneous depression of either batch value key 38 or batch count key 40 and the clear key 26. Additionally, the display panel 16 is preferable provided with an LED 42 which will be lit upon each application of power to the meter, as is conventionally done at the beginning of a day, to indicate that the dater housed within the dater door 43, shown in FIG. 1, has not been set or that the dater door 43 is open. A further LED display 44 may be provided and interconnected to be lit if necessary to reset the trip mechanism in the base 12 before operation is to continue.

In order to provide recharging or resetting of the meter, for example, by way of the keyboard 17, the meter 10 may be provided with a switch 46 having a key slot as illustrated in FIG. 1, in which the key 48 of FIG. 2 is inserted. The shaft of the lock (not shown) may be visible through a window 50 to display the position of the key 48. In the normal setting of the key 48 this shaft may display the message "operate" as illustrated. This arrangement may also be employed for remote meter resetting, as discussed in U.S. Pat. No. 4,097,923, entitled, REMOTE POSTAGE CHARGING SYSTEM USING AN ADVANCED MICROCOMPUTERIZED POSTAGE METER, the disclosure of which is incorporated herein by reference.

The meter 10 may also be provided with a service switch 52 at the rear thereof for the convenience of field service personnel enabling use of the keys 30–40 of the meter 10 for different functions. Upon operation of the switch 52, the keys 30–40 enable the display of additional values such as the unlock value, the low postage warning amount, the meter number, diagnostic status, and the maximum settable amaount.

In the charging mode, which may be attained by means of an internal switch lock (not shown) controlled by the key 48, an "enter amount" position as shown by such a message at the window 50, may enable entry of recharging value registers of the meter 10 by way of the keyboard 17. Subsequent turning of the switch 46 to an "enter combination" position, as indicated in the window 50, while entering a correct coded combination in the keyboard 17, enables the recharging mode of the meter to be effective. Returning the key 48 to the "operate" position enables the resumption of the use of the meter 10 for printing postage.

The service switch 52 may be in an unsecured position in the meter 10, since the display of the additional values rendered possible by the use of this switch 52 does not affect the security of the meter 10, but merely enables the display of further values. The fact that these values are being displayed may be shown by distinctive underlining of the display, if desired. The operation of the service switch 52 partially disables the set postage key 28. It is then not possible to set a new value of postage in the postage meter 10 when it is in the "service" mode since the interposer (not shown) will act to block operation of the meter 10 in the service mode. However, the set key 28 may still be used to cause the display of the currently set value.

When the meter 10 is in the service mode, i.e., with the switch 52 operative, and the switch 46 activated by key 48, the entry into the keyboard 17 of a new value and a code indicating the function of that value, will enable the resetting of the unlock value, low warning postage amount or maximum settable amount, respectively. The "unlock" value is a determined value, for example, one dollar, at which or above the operator should be careful in setting so as to avoid accidental printing of excessive amounts. For this purpose, all values including and above the unlock value, require an additional step on the part of the operator, such as an additional depression of the set postage key 28. The display 20 may be provided with a distinctive indication, for example, one horizontal bar, to indicate that the printing wheels (not shown) have been set but the unlock step, i.e., the additional depression of the set postage key 28, has not been effected. The completion of the unlock step would be indicated by the display 20, for example, of three horizontal bars to indicate that the meter 10 is enabled to be tripped, to print postage.

If the desending register does not contain sufficient funds to cover the set amount on the print wheels, the entire display 20 may be caused to blink. On the other hand, if the value stored in the descending register in lower than the low postage warning limit, the decimal point may be caused to blink. The "maximum settable" amount, of course, cannot be exceeded in the setting of any postage.

The meter may also be provided with a "privileged" switch 54 that is normally held in the operate position by a seal. The operation of the switch, following the cutting of the seal, enables the recharging of the meter by post office personnel in a nonremote charging mode.

In addition, the meter is provided with one or more arithmetic function keys 56, enabling a variation of the postage settng amount, such as the addition of further values to the already displayed setting value prior to the depression of the set switch 28. This feature enables the introduction by the operator of further values, such as insurance or the like, without the necessity for manual calculation or calculation on a separate device.

Figure 3:
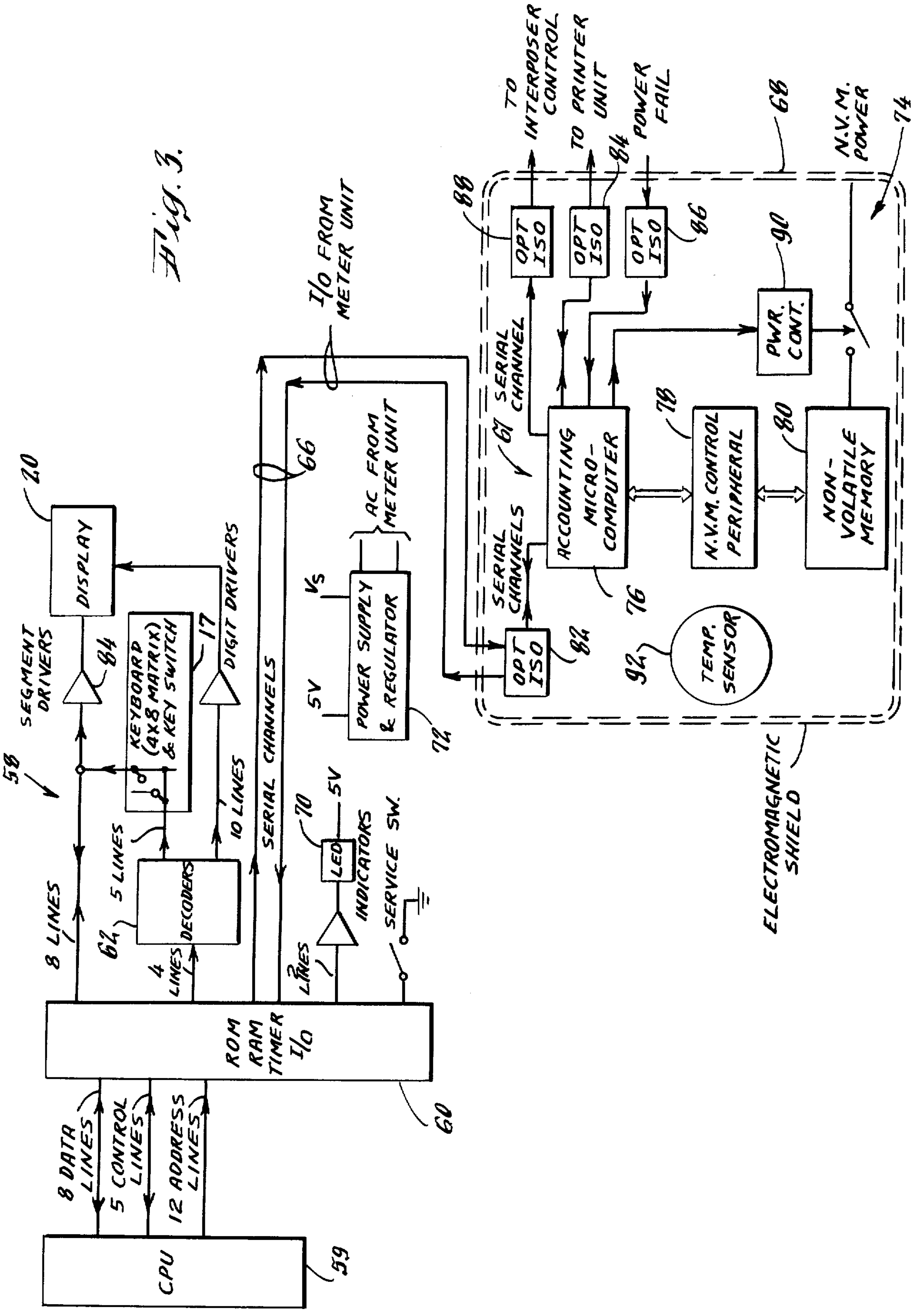
FIG. 3 is a simplified block diagram of the circuitry for the control unit and accounting unit of the postage meter of FIG. 1.

An embodiment of the control unit 58 for the meter 10 is illustrated in FIG. 3. This unit, for versatility in design, as well as for minimizing the noncritical elements that must be isolated in the physically secure housing, preferably incorporates a central processing unit 59, for example, of the 6500 series manufactured by Rockwell International Company, which is connected by way of conventional data lines, control lines and address lines to a multipurpose conventional RAM/ROM I/O timer circuit 60 incorporating read-only memories, random access memories, timing control elements and input/output interface hardware. By the use of suitable decoders 62, the keyboard 17 may be scanned in conventional fashion, and by the use of suitable drivers 84 the visual display 20 may be energized, preferable in a multiplexing mode according to conventional practice. The data relating to the depression of any of the keys of the panel 17 may thereby be communicated to the processing unit 58, for the development of a serial input/output on the lines 66 for communication with the accounting module 67 within the secure housing 68. The central processing unit 59 and circuit 60 are responsive to the requirement for operator interventions to recock the trigger mechanism in the base 12, upon the failure to open or close the dater dor 43 (FIG. 1) following application of power to the meter 10, to energize selectively an indicator LED 70 corresponding to the indicators 42 and 44, respectively, of FIG. 2. The service switch 52 may also be connected to the circuit 60. The control unit 58 may also include an internal power supply and regulator 72 connected to receive power from the postage meter low voltage power.

The above discussed functions under the control of the control unit 58 are functions which are not critical in the sense that loss of control or the contents of any register therein will not result in loss either to the post office department, or to the user, of funds. These functions have been relagated to the control unit 58 in order that the secure portions of the postal meter include only that programming of the system which must be secure. Additional functions that may be effected by the control unit 58 such as the addition of sequentially entered amounts may also be controlled by the program of the control unit, since such calculations are not critical to the security of the apparatus, and need not be effected within the physically secure portions of the postal meter. Similarly, the service resettable functions may be effected by the programming in the control unit, since these functions also are not critical to the accounting system and registers themselves. However, retention of these parameters in the NVM of the accounting unit is desirable.

While the control unit 58 of FIG. 3 is preferably disposed directly on the postage member 10 to form a part thereof, it will be apparent that it may be physically separate therefrom, or separable therefrom, whereby the postage meter 10 itself may incorporate only the elements that are required to be physically secure.

Since monetary information and control is prevalent in the serial communication employed in the system, a high degree of integrity is mandatory. For this purpose, the system is designed, in the serial transmission communication sections, such that a transmitted bit is returned or ∓echoed" by the receiver thereof for checking purposes. If the transmitter thereby receives all of the echoed signals satisfactorily, it may issue a "no error" pulse, thereby informing the receiver of the information that the received information is valid.

The program of the control unit is directed to servicing of the keyboard 17 display panel 16, etc., so that the control functions and storage of data are effected primarily in the accounting unit. The program thereby includes those functions necessary for the scanning of the keyboard 17, multiplexing of the display 16, formatting of signals for communication with the other units, and with external devices, etc., so that any new information may be passed on to the accounting unit 67. The program for the control unit 58 is disclosed in the aforementined U.S. patent application Ser. No. 89,413 entitled, ELECTRONIC POSTAGE METER HAVING PLURAL COMPUTING SYSTEMS, previously referenced.

The arrangement of the components in the accounting compartment 74 is shown within the double dotted rectangle walls 68 of FIG. 3. The walls 67 of the accounting compartment 74 are preferably constructed to form an electromagnetic shield. The accounting compartment 74 includes an acounting microcomputer 76 electrically coupled to a NVM control 78. The NVM control 78 controls the application of stored data between a volatile memory (here part of the accounting microcomputer 76) and a nonvolatile memory 80, e.g., General Instrument part number ER 34ØØ or equivalent. The volatile memory such as a random access memory, may function as a working ascending register, working descending register, and the like. The accounting microcomputer 76 also includes read only memory control for the necessary accounting routines, as well as control routines. This unit may, in addition, incorporate serial interfaces, to enable its interfacing with the printing and control modules. The accounting microcomputer 76 may, for example, comprise the 8048 series microcomputer from Intel Corporation, Santa Clara, Calif., in a manner similar to that described above with respect to the control unit 58. In order to avoid damage to the accounting unit 67 by electric surges applied accidentally or intentionally, and to eliminate noise induced via ground loops, the accounting microcomputer 76 communicates with the devices external of the compartment 76 by suitable isolators that are not capable of applying voltage surges to the microcomputer 76. These isolators may, for example, be in the form of opto-electronic couplers and are also preferably arranged so as to be inaccessible from the exterior of the postage meter 10. One isolator unit 82 may be provided for the two-way communication path with the control unit 58. A further isolator arrangement 84 may be provided for the two-way communication with the printer unit (not shown). A still further isolator 86 may be provided for applying the power sensing signals to the microcomputer 76. In addition, an isolator 88 may be provided for controlling an interposer (not shown) in the printing module for mechanically blocking functions of the printer. Such a system is disclosed, for example, in U.S. patent application Ser. No. 024,812, filed Mar. 28, 1979, about to issue as U.S. Pat. No. 4,253,015, for R. McFiggans and A. Eckert, entitled POSTAGE METER IMPROVEMENT, and assigned to the same assignee as the present application; the disclosure of which is specifically incorporated herein by reference.

The NVM 80 is preferably in the form of an MNOS memory which does not require a back-up source. This memory may, however, alternatively be formed of elements which do require a power back-up, in which case a power control circuit may be employed to apply back-up power thereto external of the compartment 73. A power control circuit 90 provides power to the MNOS memory for the purpose of effecting its data transfer operation, essential during power up and down. The program of the microcomputer 76 is organized to enter the contents of the registers of the computer units into the NVM 80 as soon as any indication of failure of the power supply occurs, and to restore this data to the working registers upon restoration of the power. The program for the accounting unit 76 is disclosed in the aforementioned U.S. patent application Ser. No. 89,413, entitled, ELECTRONIC POSTAGE METER HAVING PLURAL COMPUTING SYSTEMS, previously referenced.

Systems for the transfer of data between volatile and nonvolatile memories are well known, and are disclosed, for example, in U.S. Pat. No. 4,224,506 for ELECTRONIC COUNTER WITH NONVOLATILE MEMORY, assigned to the same assignee as the present application.

The compartment 74 may further comprise a temperature sensor 92, with suitable circuits (not shown) coupled thereto, such as to the microcomputer 76, for transferring data to the NVM 80 in the event of excessive temperature. Suitable circuits (not shown) coupled to the microcomputer 76 prevent the operation of the interposer solenoid (not shown) by way of the isolator 88, in the event of excessive temperatures. It will be appreciated that the interposer is controlled by the microcomputer 76 also to inhibit operation of the printer (not shown) in the event that insufficient postage remains for a printing operation, or other accounting data indicates that the meter 10 should not be operative.

Two basic error checks are provided in the software routine of the meter 10 as disclosed in the aforementioned U.S. patent application Ser. No. 89,413, entitled, ELECTRONIC POSTAGE METER HAVING PLURAL COMPUTING SYSTEMS. These two checks are termed fatal and procedural, respectively. Under the category of fatal error checks, two subcategories are defined. These two subcategories are termed hard and soft, respectively. Hard errors are determined by monitoring hardware sensors, such as the bank and digit select sensors, interposer position sensors, shutter bar sensor, and the like. A failure to those sensors to provide proper readings will be termed a fatal hard error, will lock up the meter and will be non-recoverable upon power-up. Central authority intervention will be required to permit further operation of the meter.

Another example of a fatal hardware error is a resulting non-compare from a cyclic redundancy check (CRC). Each data register is continually monitored. Using standard polynomial techniques, a cyclical redundancy remainder is calculated for each updated data register value. When a power-down cycle is initiated, the contents of each data register and its associated cyclical redundancy remainder is transferred to the NVM. Upon power-up, the cyclical redundancy remainder of each data register is again calculated and compared to the cyclical remainder previously calculated upon power-down. A non-compare will produce a fatal hard error.

Fatal soft errors relate to the intercommunication capability of the meter units. Thus, communication errors between internal units such as the accounting, printer and control units will be sensed, based upon the bit retransmission previously described. In addition, communication time-out functions are provided, so that the failure of a unit to communicate within a specified period will also produce a soft fatal error. Soft fatal errors will block meter operation. Unblocking can be effected by recycling the meter; that is to say, the meter is turned off, then on again, thereby causing recycling and clearing the error. The power recycling will be counted in a data register and, as noted above, upon reaching a predetermined number, could cause total lock up if desired.

Procedural errors, such as improper, for example, (high) value entries, or an attempted improper procedure, manifest themselves as visual flags on the display.

Other diagnostic checks, as well as variations as set forth above, may be easily accommodated with the software routines disclosed in aforementioned U.S. patent application Ser. No. 89,413, entitled, ELECTRONIC POSTAGE METER HAVING PLURAL COMPUTING SYSTEMS.

It is a characteristic of the NVM 80 that the more frequently it is erased and written (exercised), the poorer its rention qualities become. Advantageously, this characteristic can be used to monitor the retention capability of the NVM 80 and remove a worn one from service before actual failure.

When the prematurely degraded field of data of the NVM 80 fails, a signal or flag is set in the NVM 80. Thereafter, the flag is transmitted to the data center within the access code during the next remote resetting or recharging operation to alert the service center that the meter has a weak memory and should be removed from service.

Figure 4:
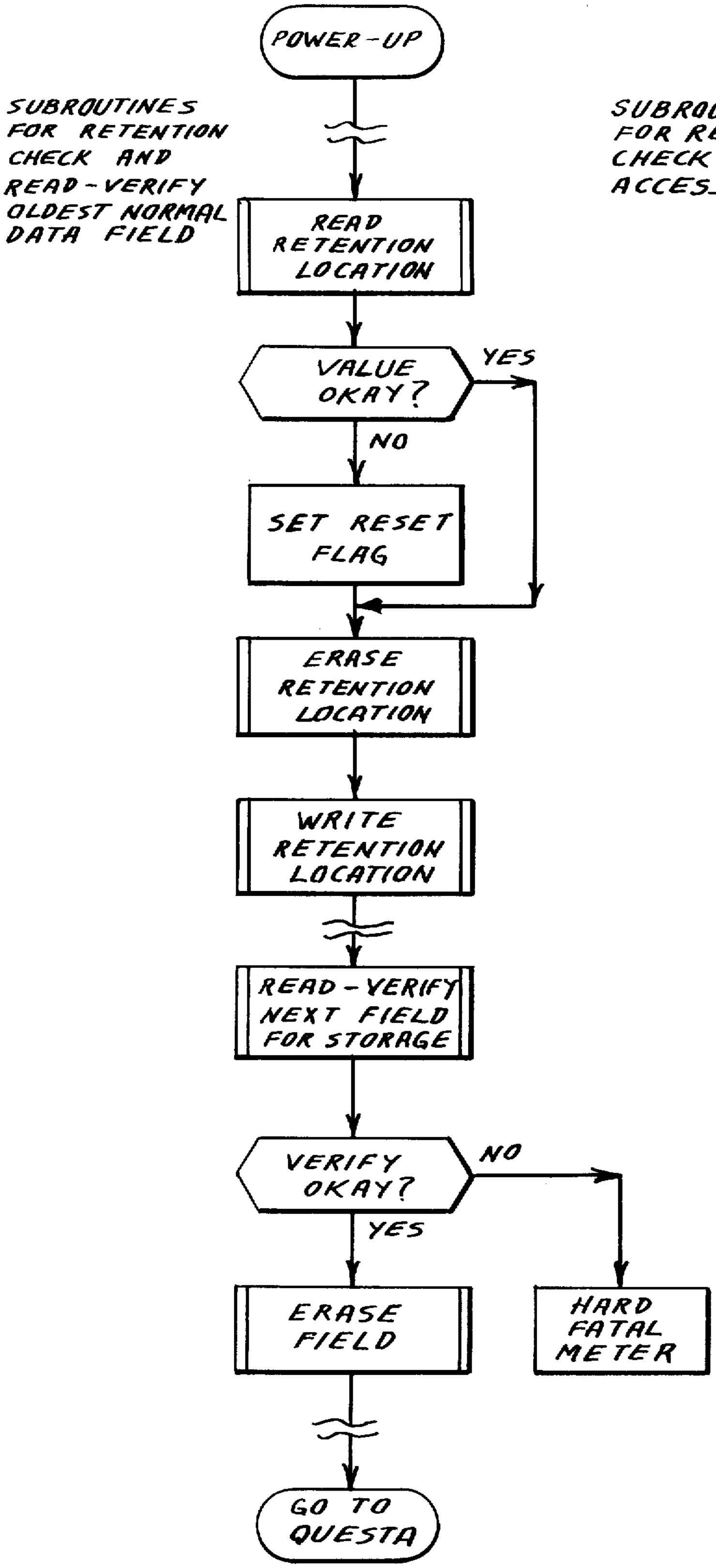
FIG. 4 is a partial flow chart of the power-up routine showing the subroutines for the nonvolatile retention check and read-verify of the oldest normal data field for the nonvolatile memory.

The flow chart showing the Retention Check Subroutine portion of the Power Up Routine is illustrated in FIG. 4. If the retention check (data field) is not okay, a retention failure flag is set prior to continuing the Power Up Routine. However, if the retention Check is okay, the setting of a retention failure flag is bypassed and the Power Up Routine continues. Significantly, with either condition the Power Up Routine continues as seen in FIG. 4.

Referring to FIG. 5, the NVM 80 is shown enlarged and segmented into a number of specific logical groupings or fields as indicated. However, it should be understood that additional fields may be provided in the NVM 80 to store, e.g., data for endurance testing. During the Retention Check of the Power Up Routine, shown in FIG. 4, a predetermined retention field 94 in the NVM 80 is read by the microcomputer 76. After the reading is obtained, the data in the predetermined retention field 94 is erased and rewritten. The reading obtained from the predetermined rention field 94 is compared with a constant value (initial value) of the data which is stored in the ROM of the computer 76. If the reading at the field 94 is not the constant value, a modify reset flag signal 96 is applied to a service field 98 in the NVM 80. During the next attempt by the meter operator to obtain a reset combination, the modify reset flag signal 96 is transmitted to the data center (not shown) via a communications link, e.g., a telephone line, as part of the Access Code. This entire sequence being transparent to the meter operator.

Preferably, as illustrated in FIG. 5, the NVM 80 is divided into 14 normal fields 100 for storing critical data. Since a different one of the normal data fields 100 is read during each Power-Up Cycle, it is apparent that the predetermined retention 94 is exercised 14 more times than each normal field 100. Therefore, the predetermined retention field 94 is purposefully cycled and thereby degraded 14 times faster than the normal fields 100. Further, during each Power-Up Routine, as shown in FIG. 4, the data in the predetermined retention field 94 exercised, i.e., erased and rewritten. Thus, the predetermined field 94 is intentionally degraded with each Power-Up and Power-Down Cycle.

Although the data field last written on Power-Down cycle is read on the Power-Up cycle, it is apparent that there is also information stored in memory further in the past; specifically up to 13 on/off cycles earlier. This information can be used to determine the long time retention of the NVM 80 and to take the meter out of service before failure of the NVM 80.

During the Power-Up Routine, as seen in FIG. 4, there is an Oldest (next) Normal Data Field Subroutine for indicating whether the data in the next field in normal fields of data can be read verified. If not, the meter 10 is rendered non-operational.

Specifically, referring to FIG. 6, a block diagram illustrates communication between the postage meter 10, a data center 102 and a service center 104, e.g., via a communications line 106, such as a telephone or a direct data link. As discussed with reference to FIG. 5, if a modify reset flag signal 96 is stored in the service field 98 of the NVM 80, when the meter operator next telephones the data center 102 to obtain the proper reset combination for recharging the meter 10, the presence of the modify reset flag signal 96 is communicated to the data center 102 within the Access Code. The presence of the modify reset flag 96 within the Access Code alerts the data center 102 that the meter 10 has a weak NVM 80. The data center 102 then communicates with the service department 104 to advise it of this condition.

Figure 7:
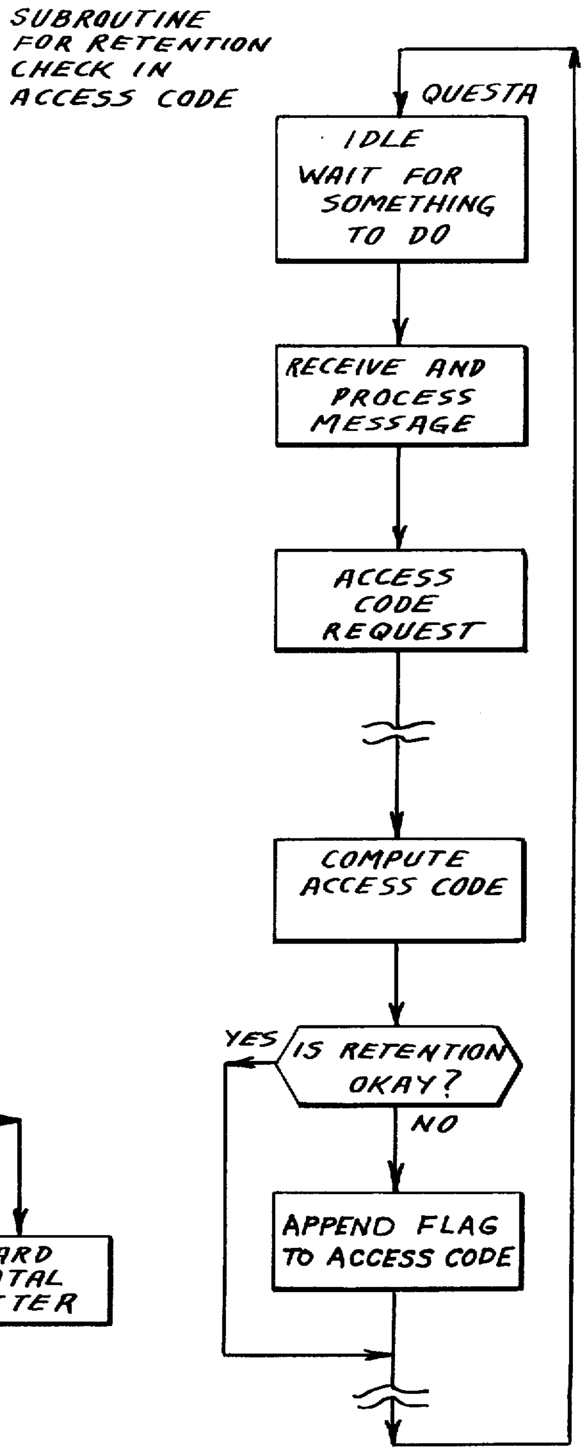
FIG. 7 is a partial flow chart showing the subroutine for incorporating the retention check signal within the access code.

Referring to FIG. 7, the flow chart for the incorporation of Retention Check in the Access Code is illustrated. The Access Code CRC is computed in the meter 10 when the meter operator desires to access the data center 102 for the next reset combination to recharge the meter 10. If the retention check is not okay (retention flag has been set) this flag is appended to the access code indicating a weak NVM 80. If the Retention Check is okay, the modification is bypassed and the Access Code Routine continues to completion. Further details on generating an access code is disclosed in the aforementioned U.S. patent applications: Ser. No. 168,931, entitled, DATA CENTER FOR REMOTE POSTAGE METER RECHARGING SYSTEM HAVING PHYSICALLY SECURE ENCRYPTING APPARATUS, and Ser. No. 168,932, entitled, IMPROVED REMOTE POSTAGE METER RECHARGING SYSTEM.

The indication of a weak memory may be communicated from the data center 102 (FIG. 6) to the service department 104 of the meter manufacturer by hard wire or via a written response. The service man is thus given advance warning to remove the meter 10 for replacement of the weak NVM 80. The funds remaining in the removed meter 10 may be cleared from the descending register by the post office.

It should be apparent to those skilled in the art that various modifications may be made in the present invention without departing from the spirit and scope thereof, as described in the specification and defined in the appended claims.

What is claimed is:

1. An accounting section for an electronic postage meter, comprising:

a nonvolatile memory having a plurality of normal data fields and a predetermined data field;

means for exercising said predetermined data field by erasing any data therein and writing a predetermined value therein;

computer means communicatingly connected to said nonvolatile memory for determining the data retention condition of said predetermined data field during a power-up cycle of the meter by reading said predetermined retention data field on every power-up cycle of said meter while reading a different one of said normal data fields on each power-up cycle, so that said predetermined retention data field is purposely cycled and degraded faster than said normal data fields;

means for establishing a constant value;

means for storing a value which results from a reading of said predetermined data field by said computer means; and means for generating a signal when said stored value fails to correspond to said constant value obtained from a reading of said predetermined data field.

2. The electronic postage meter recited in claim 1, wherein:

the meter has memory means for storing a value;

said nonvolatile memory stores in said predetermined data field a signal which results from a reading of said nonvolatile memory by said computer means; and said computer means is in connection with said memory means and said nonvolatile memory to receive said signal and said value;

whereby said computer means may compare said signal with said value to determine said data retention condition.

3. The electronic postage meter recited in claim 1, including:

communicating means for communicating with a data center the presence of a signal generated as a result of reading the predetermined data field of said nonvolatile memory by said computer means.

4. The electronic postage meter recited in claim 1, wherein:

said computer means reads the oldest data field of said normal data fields during the power-up cycle and generates a signal in the absence of a reading therefrom.

5. A method for determining the data retention condition of a nonvolatile memory in an electronic postage meter which nonvolatile memory has a plurality of data fields, comprising the steps of:

assigning one of the data fields as a predetermined data field;

establishing a constant value;

reading the data in a predetermined data field within the nonvolatile memory during a power-up cycle of the meter while reading of a different one of the other data fields so that the predetermined data field is purposely cycled and degraded faster than the other data fields;

storing a value which results from the reading of the predetermined data field;

generating a signal if the value of the data read in the predetermined data field fails to correspond with the constant value, thereby indicating that the nonvolatile memory is weak;

erasing the data in the predetermined data field subsequent to the reading step; and rewriting the constant value in the predetermined data field after the data therein has been erased.

6. The method recited in claim 5, including the steps of:

storing the signal indicating a weak nonvolatile memory in another data field of the nonvolatile memory.

7. The method recited in claim 5, including the steps of:

communicating to a data center the presence of the signal indicating a weak nonvolatile memory.

8. The method recited in claim 5, including the step of:

communicating to a service center the presence of a signal indicating a weak nonvolatile memory.

9. The method recited in claim 5, including the steps of:

establishing a communication link with a data center to communicate the existence of a signal indicating a weak nonvolatile memory to the data center; and communicating the existence of a weak nonvolatile memory to a service center.

10. The method recited in claim 5, wherein:

the predetermined data field occupies more than one discrete area of the nonvolatile memory.

11. The method recited in claim 5, including the steps of:

reading the data present in the oldest normal data field of the nonvolatile memory;

generating a signal indicating that the nonvolatile memory is weak in the absence of a reading from the oldest normal data field.

12. A method for determining when an electronic postage meter has a weak nonvolatile memory, comprising the steps of:

establishing a constant value;

reading a predetermined field of data within a nonvolatile memory having a plurality of fields of data;

comparing the reading obtained from the predetermined field of data with the constant value;

generating a signal as a result of the comparing step if the reading obtained from the predetermined field of data fails to correspond with the constant value;

storing the signal resulting from the generating step in one of the fields of data other than the predetermined field of data;

communicating the existence of the stored signal to a data center;

erasing the data in the predetermined field of data subsequent to the comparing step; and writing the constant value into the predetermined field of data subsequent to the erasing step.

13. The method recited in claim 12, including the steps of:

communicating the existence of the stored signal from the data center to a service center.

14. The method recited in claims 12 or 13 wherein: the plurality of fields of data include normal data fields, including the steps of:

reading the oldest normal data field;

generating a signal indicating that the nonvolatile memory is weak in the absence of a reading from the oldest normal data field.

* * * * *